(12) United States Patent
Li

(10) Patent No.: US 12,492,535 B1
(45) Date of Patent: Dec. 9, 2025

(54) HANDLE ASSEMBLY, FAUCET CONTROLLER, AND FAUCET

(71) Applicant: Yuanyuan Li, Anhui (CN)

(72) Inventor: Yuanyuan Li, Anhui (CN)

( * ) Notice: Subject to any disclaimer, the term of this patent is extended or adjusted under 35 U.S.C. 154(b) by 0 days.

(21) Appl. No.: 19/250,720

(22) Filed: Jun. 26, 2025

(30) Foreign Application Priority Data

Jun. 5, 2025 (CN) .......................... 202521147246.1

(51) Int. Cl.
*E03C 1/04* (2006.01)
*F16K 31/60* (2006.01)

(52) U.S. Cl.
CPC .......... *E03C 1/0412* (2013.01); *F16K 31/602* (2013.01)

(58) Field of Classification Search
CPC .... F16K 31/605; E03C 1/0412; E03C 1/0409; E03C 2001/0417
See application file for complete search history.

(56) References Cited

U.S. PATENT DOCUMENTS

| | | | | |
|---|---|---|---|---|
| 1,654,550 A * | 1/1928 | Muend | ..................... | F16K 27/12 137/359 |
| 4,961,443 A * | 10/1990 | Buccicone | ............ | F16K 31/607 137/315.15 |
| 5,960,830 A * | 10/1999 | Hansen | ................. | F16K 31/605 403/372 |
| 10,436,343 B2 * | 10/2019 | Crowe | .................. | E03C 1/0412 |

* cited by examiner

*Primary Examiner* — Michael R Reid
(74) *Attorney, Agent, or Firm* — HOWARD M COHN and Associates, LLC

(57) ABSTRACT

A handle assembly, a faucet controller, and a faucet are provided. The handle assembly includes a handle, a bushing, and a valve stem sleeve. A first end of the bushing is fixed to the handle. A first end of the valve stem sleeve is detachably connected to a second end of the bushing away from the handle. A connecting port matched with a valve core is disposed on a second end of the valve stem sleeve away from the bushing.

17 Claims, 14 Drawing Sheets

HANDLE ASSEMBLY, FAUCET CONTROLLER, AND FAUCET

TECHNICAL FIELD

The present disclosure relates to a technical field of faucets, and in particular to a handle assembly, a faucet controller, and a faucet.

BACKGROUND

In the prior art, in order to meet aesthetic needs of users for faucets that are simple, stylish and do not take up too much space, a water outlet assembly and a faucet controller of the faucets are separately disposed. In this way, not only an appearance of the faucets is more simple and smooth, but also the appearance of the faucets is allowed to be adapted to various decoration styles.

The faucet controller commonly includes a valve assembly and a handle assembly. Generally, the valve assembly is first installed on a wall or a countertop, and then the handle assembly is connected to a valve core of the valve assembly. However, in different installation scenarios, a length of the valve core of the valve assembly that needs to extend outward may be different, and the handle assembly in the prior art is difficult to adapt to different installation scenarios.

SUMMARY

The present disclosure provides a handle assembly, a faucet controller, and a faucet, which are able to adapt to different installation scenarios.

In a first aspect, the present disclosure provides the handle assembly. The handle assembly comprises a handle, a bushing, and a valve stem sleeve.

A first end of the bushing is fixed to the handle. A first end of the valve stem sleeve is detachably connected to a second end of the bushing away from the handle. A connecting port matched with a valve core is disposed on a second end of the valve stem sleeve away from the bushing.

In some embodiments, the handle comprises at least one first positioning portion. At least one second positioning portion is disposed on the first end of the bushing. At least one first limiting portion is disposed on the second end of the bushing. At least one second limiting portion is disposed on the valve stem sleeve. The at least one first positioning portion is matched with the at least one second positioning portion, so that the bushing and the handle are only allowed to be installed in a single circumferential direction. The at least one first limiting portion is matched with the at least one second limiting portion, so that the bushing and the valve stem sleeve are only allowed to be installed in the single circumferential direction.

In some embodiments, a mounting groove is defined on a bottom portion of the handle. The at least one first positioning portion is at least one positioning groove recessed from a side wall of the mounting groove. The at least one second positioning portion is at least one positioning boss protruding from an outer wall of the bushin. The first end of the bushing is plugged into the mounting groove, and the at least one positioning boss is engaged with the at least one positioning groove, so that the bushing and the handle are only allowed to be installed in the single circumferential direction.

In some embodiments, the at least one positioning groove comprises one positioning groove and the at least one positioning boss comprises one positioning boss.

Alternatively, the at least one positioning groove comprises a plurality of positioning grooves, the at least one positioning boss comprises a plurality of positioning bosses, the plurality of positioning bosses are distributed at unequal angles in a circumferential direction of the mounting groove, and positions of the plurality of positioning grooves are respectively matched with positions of the plurality of positioning bosses.

Alternatively, the at least one positioning groove comprises the plurality of positioning grooves, the at least one positioning boss comprises the plurality of positioning bosses, a width L1 of one of the plurality of positioning bosses is greater than a width L2 of another positioning boss, and sizes of the plurality of positioning grooves are respectively matched with sizes of the plurality of positioning bosses.

In some embodiments, a first guide surface is disposed at one end, close to the handle, of the at least one positioning boss. The first guide surface is obliquely disposed in a direction away from the handle.

In some embodiments, a fixing groove is defined on the second end of the bushing. The at least one first limiting portion is at least one limiting groove recessed from a side wall of the fixing groove. The at least one second limiting portion is at least one limiting boss protruding from an outer wall of the valve stem sleeve. The first end of the valve stem sleeve is plugged into the at least one limiting groove. The at least one limiting boss is engaged with the at least one limiting groove, so that the bushing and the valve stem sleeve are only allowed to be installed in the single circumferential direction.

In some embodiments, the at least one limiting groove comprises one limiting groove, and the at least one limiting boss comprises one limiting boss.

Alternatively, the at least one limiting groove comprises a plurality of limiting grooves, the at least one limiting boss comprises a plurality of limiting bosses, the plurality of limiting bosses are distributed at unequal angles in a circumferential direction of the fixing groove, and positions of the plurality of limiting grooves are respectively matched with positions of the plurality of limiting bosses.

Alternatively, the at least one limiting groove comprises the plurality of limiting grooves, the at least one limiting boss comprises the plurality of limiting bosses, a width D1 of one of the plurality of limiting bosses is greater than a width D2 of another limiting boss, and sizes of the plurality of limiting grooves are respectively matched with sizes of the plurality of limiting bosses.

In some embodiments, a second guide surface is disposed at one end, close to the bushing, of the at least one limiting boss. The second guide surface is obliquely disposed upwards in a direction away from the bushing.

In some embodiments, the handle defines a blind hole, the bushing defines a through hole, and the fixing groove forms a part of the through hole. The handle assembly further comprises a connecting piece. The connecting piece passes through the through hole and is fixed in the blind hole, so that the bushing is fixed to the handle.

In some embodiments, a first limiting step is formed on a bottom wall of the fixing groove in an axial direction of the bushing. The first limiting step is configured to limit a length of the valve stem sleeve extending into the fixing groove.

In some embodiments, a mounting groove is defined on the handle. The first end of the bushing is disposed in the mounting groove and abuts against a bottom portion of the mounting groove. The blind hole is defined on the bottom portion of the mounting groove.

In some embodiments, the connecting piece is a screw, and the blind hole is a threaded hole. A second limiting step is disposed on an inner wall of the through hole. A head of the screw abuts against the second limiting step. The fixing groove configured to mount the valve stem sleeve is disposed between the second end of the bushing and the second limiting step.

In some embodiments, the handle assembly further comprises a base defining a mounting cavity. The handle is rotatably installed at a top portion of the base. The bushing and the valve stem sleeve are disposed in the mounting cavity. The bushing comprises a limiting protrusion. The mounting cavity comprises a mounting step, and the limiting protrusion abuts against the mounting step.

In some embodiments, the handle comprises a rotating shaft portion, the mounting cavity comprises a hole section, the rotating shaft portion is rotatably installed in the hole section. A portion of a bottom wall of the hole section protrudes inward to form a positioning step. The handle assembly further comprises a spacer. The spacer is installed between the positioning step and an end face of the rotating shaft portion. The spacer is configured to reduce wear between the rotating shaft portion and the hole section.

In some embodiments, an internal thread screwed with a valve assembly is disposed on a side wall of the mounting cavity. The base is screwed with the valve assembly.

In some embodiments, the valve stem sleeve is selected from a first valve stem sleeve and a second valve stem sleeve. A length of the first valve stem sleeve is different from a length of the second valve stem sleeve. One of the first valve stem sleeve and the second valve stem sleeve is detachably connected to the bushing.

In a second aspect, the present disclosure provides the faucet controller. The faucet controller comprises a valve assembly and the handle assembly mentioned above. The valve assembly comprises a valve body and the valve core rotatably installed on the valve body. The valve stem sleeve is detachably connected to the valve core.

In some embodiments, the valve core defines a threaded fixing hole. The valve stem sleeve defines a mounting hole. A screw passes through the mounting hole and is fixed in the threaded fixing hole, so that the valve stem sleeve is connected to the valve core.

In some embodiments, the faucet controller further comprises a sleeve. The sleeve is sleeved on an outer side of the valve body and is screwed with the valve body, and a base of the handle assembly abuts against one side of the sleeve.

In a third aspect, the present disclosure provides the faucet. The faucet comprises a water outlet assembly and two faucet controllers mentioned above.

The two faucet controllers are respectively located on two sides of the water outlet assembly. Water outlets of the two faucet controllers are communicated with a water inlet of the water outlet assembly.

In the present disclosure, by providing the valve stem sleeve that is detachably connected to the bushing, an operator is able to select a suitable valve stem sleeve for installation according to actual installation conditions. In this way, the handle assembly is able to adapt to different installation environments and effectively ensure a tight and fitting connection between the handle assembly and the valve core, thereby ensuring that the faucet operates stably and normally.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
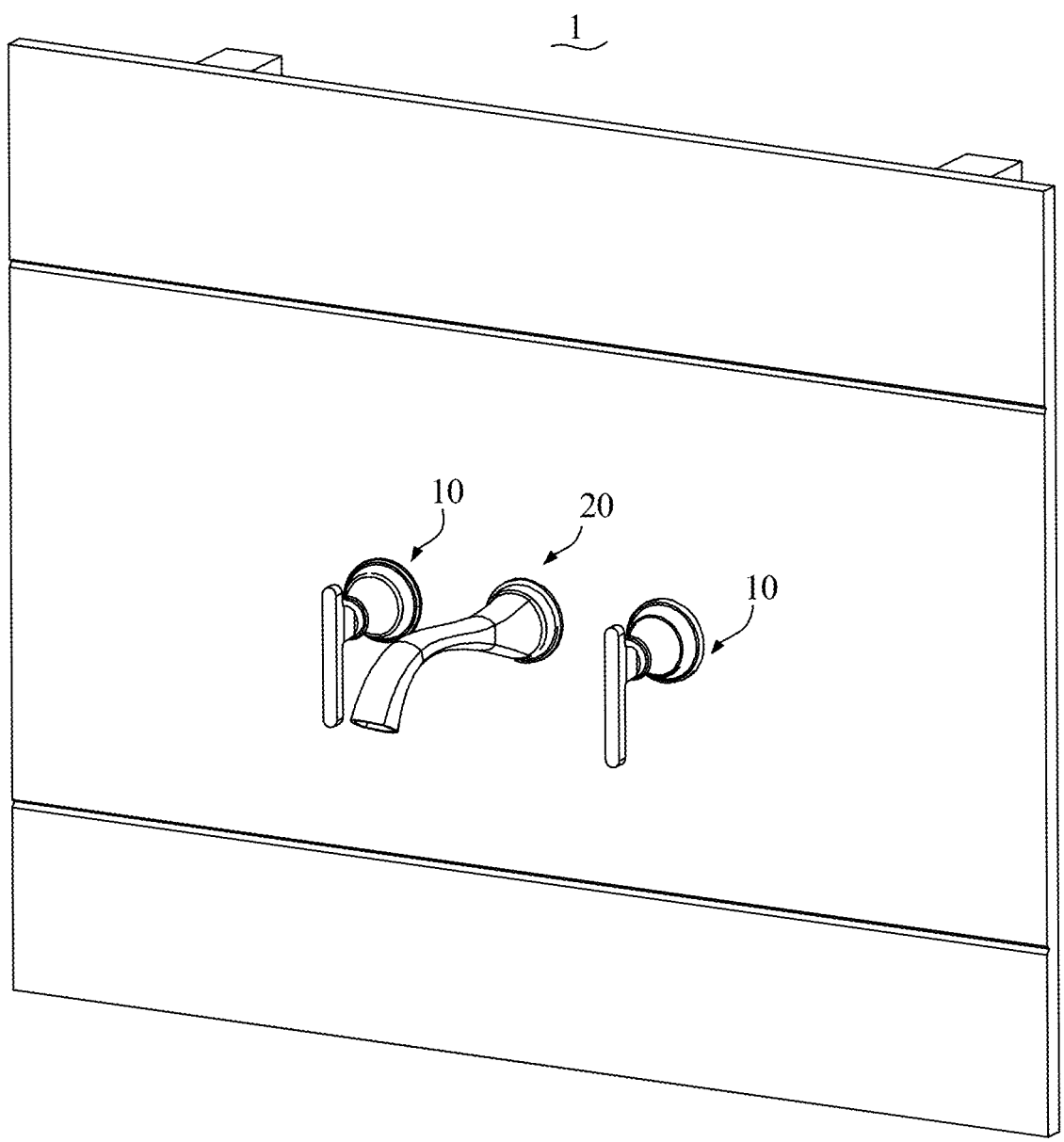
FIG. 1 is a schematic diagram of a faucet installed on a wall according to a first embodiment of the present disclosure.

In the drawings: 1—faucet; 10—faucet controller; 100—handle assembly; 110—base; 110a—mounting cavity; 112—mounting step; 113—hole section; 114—positioning step; 120—handle; 120a—mounting groove; 120b—blind hole; 121—first positioning portion; 1211—positioning groove; 124—rotating shaft portion; 130—bushing; 130A—through hole; 130a—fixing groove; 131—second positioning portion; 1311—positioning boss; 1312—first guide surface; 132—first limiting portion; 1321—limiting groove; 133—limiting protrusion; 134—first limiting step; 135—second limiting step; 140—valve stem sleeve; 140a—mounting hole; 141—connecting port; 142—second limiting portion; 1421—limiting boss; 1422—second guide surface; 143—first valve stem sleeve; 144—second valve stem sleeve; 150—spacer; 200—valve assembly; 210— valve body; 220—valve core; 221—threaded fixing hole; 300—sleeve; 20—water outlet assembly; 21—water outlet nozzle.

Realization of purposes, functional features, and advantages of the present disclosure is further explained in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or implicitly include at least one feature. Unless otherwise indicated, the term "a plurality of" means two or more. The term "and/or" depicts relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

In order to meet aesthetic needs of users for faucets that are simple, stylish and do not take up too much space, a water outlet assembly and a faucet controller of a faucet in the prior art are separately disposed. In this way, not only an appearance of the faucet in the prior art is more simple and smooth, but also the appearance of the faucet in the prior art is allowed to be adapted to various decoration styles.

The faucet controller in the prior art commonly includes a valve assembly and a handle assembly. Generally, the valve assembly is first installed on a wall or a countertop, and then the handle assembly is connected to a valve core of the valve assembly. However, in different installation scenarios, a length of the valve core of the valve assembly that needs to extend outward may be different. For example, when the valve assembly is installed in a wall, the length of the valve core that needs to be extended may be relatively long, while when the valve assembly is installed in a countertop, the length of the valve core that needs to be extended may be relatively short.

In addition, errors are prone to occur during the installation of the valve assembly, especially when the valve assembly is installed in the wall. During a decoration process, in order to ensure overall aesthetics and flatness of the wall, the valve assembly is generally installed first, and then the wall is subjected to decorative processes such as painting, tiling or cementing. Once the decoration process of the wall is completed, the valve assembly is fixed in the wall, and a position and a state thereof are basically determined. At this time, if an extension length of the valve core is found to be inappropriate, it is extremely difficult to adjust.

When the extension length of the valve core is too short, a transmission connection between the handle assembly and the valve core may not fit tightly, resulting in loose connection. During use, a handle of the faucet is prone to shaking, offset and other phenomena, which not only affects a normal operation of the faucet, but also causes wear of the connecting pieces due to long-term looseness, shorten the service life of the faucet, and even cause safety hazards such as water leakage.

When the extension length of the valve core is too long, after the handle assembly and the valve core are installed, a base of the handle assembly may not fit with the countertop or the wall, which affects the stability of a rotation of the handle assembly and affects the aesthetics of the faucet.

Figure 2:
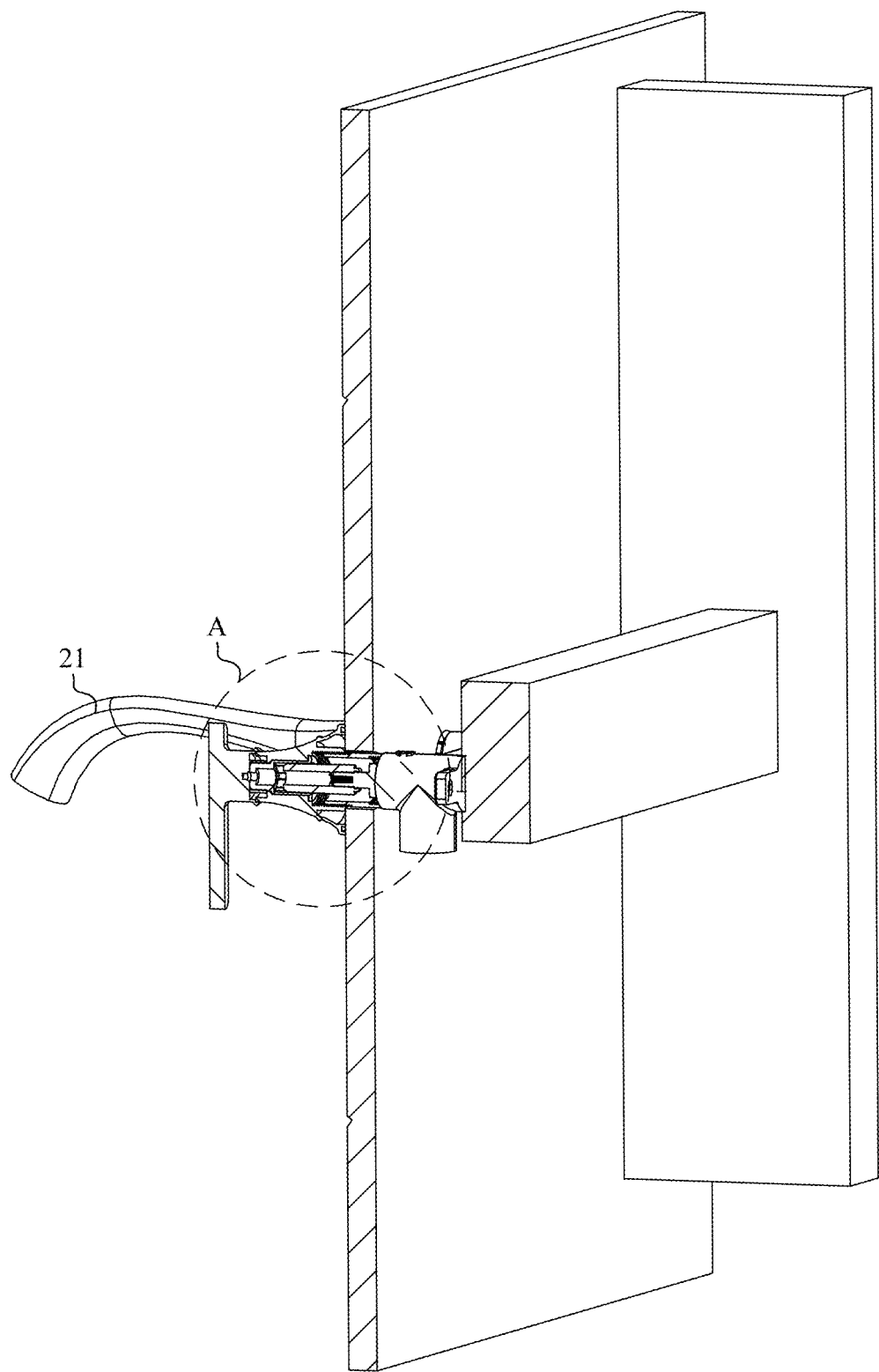
FIG. 2 is a cross-sectional schematic diagram of the faucet installed on the wall according to the first embodiment of the present disclosure.
Figure 3:
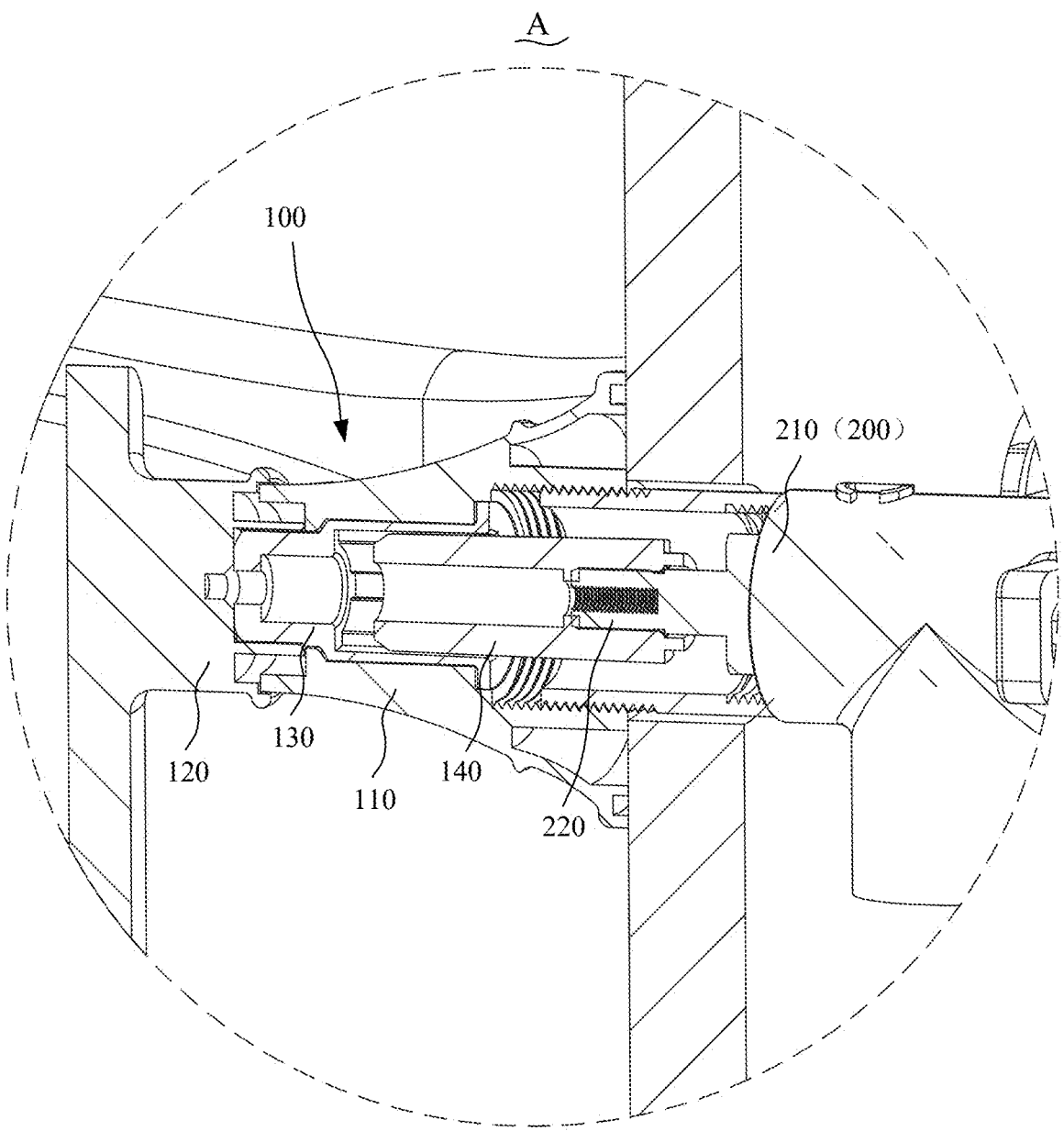
FIG. 3 is an enlarged schematic diagram of area A shown in FIG. 2.

The present disclosure provides a faucet 1 to solve technical problems mentioned above. the handle assembly. As shown in FIGS. 1-2, the faucet 1 includes a water outlet assembly 20 and at least one faucet controller 10. A water inlet of the water outlet assembly 20 is communicated with a water outlet of the at least one faucet controller 10. The water outlet assembly 20 includes a water outlet nozzle 21 and a water outlet pipe communicated with the water outlet nozzle 21. The water outlet nozzle 21 may be designed in different shapes, such as round, flat, etc., to meet different water outlet requirements. The water outlet pipe is communicated with the at least one faucet controller 10 and the water outlet nozzle 21, so that the at least one faucet controller 10 is able to control a water outlet state of the water outlet nozzle 21.

The at least one faucet controller 10 comprises two faucet controllers 10. The two faucet controllers 10 are respectively located on two sides of the water outlet assembly 20. The two faucet controllers 10 are connected to different water supply pipes, where a first water supply pipe is configured to transport hot water and a second water supply pipe is configured to transport cold water. Thus, a temperature of water flowing out from the water outlet 21 is controlled by adjusting the two faucet controllers 10.

As shown in FIGS. 3-6, the present disclosure takes one of the faucet controllers 10 for further illustration. The faucet controller 10 comprises a valve assembly 200 and a handle assembly 100. The valve assembly 200 comprises a valve body 210 and the valve core 220 rotatably installed on the valve body 210. The valve stem sleeve is detachably connected to the valve core 220. The handle assembly 100 is detachably connected to the valve core 220 and is configured to control the valve core 220 to adjust the water outlet state of the water outlet 21. The handle assembly 100 includes a base 110, a handle 120, a bushing 130, and a valve stem sleeve 140. The base 110 defines a mounting cavity 110a. The handle 120 is rotatably installed at a top portion of the base 110. The bushing 130 and the valve stem sleeve 140 are disposed in the mounting cavity 110a. A first end of the bushing 130 is fixed to the handle 120. A first end of the valve stem sleeve 140 is detachably connected to a second end of the bushing 130 away from the handle 120. A connecting port 141 matched with the valve core 220 is disposed on a second end of the valve stem sleeve 140 away from the bushing 130. The connecting port 141 is configured to be connected to the valve core 220.

In some embodiments, an internal thread screwed with a valve assembly 200 is disposed on a side wall of the mounting cavity 110a of the base 110. The base 110 is screwed with the valve assembly 200. In the embodiment, the base 110 is easy to install and has high stability, which prevents components of the handle assembly 100 and the valve assembly 200 from separating from each other, and improves rotation stability between the handle 120, the bushing 130, the valve stem sleeve 140, and the valve core 220.

Optionally, the connecting port 141 is an inner spline disposed on a second end of the valve stem sleeve 140 away from the bushing, and an outer spline is disposed on an outer side of the valve core 220. When the valve stem sleeve 140 is sleeved on the valve core 220, the inner spline is engaged with the outer spline, so that the valve core 220 and the valve stem sleeve 140 are fixedly connected in a circumferential direction. When the user rotates the handle 120, the bushing 130 is driven to rotate, thereby driving the valve stem sleeve 140 to rotate, and driving the valve core 220 to rotate. In this way, an opening state of the valve assembly 200 is adjusted, and the water outlet state of the water outlet assembly 20 is controlled.

In the present disclosure, by providing the valve stem sleeve 140 that is detachably connected to the bushing 130, an operator is able to select a suitable valve stem sleeve 140 for installation according to actual installation conditions. For example, when the faucet 1 is installed on the wall, a valve stem sleeve 140 that is relatively long is selected for installation. When the faucet 1 is installed on the countertop, a valve stem sleeve 140 that is relatively short is selected for installation. In addition, a valve stem sleeve 140 with a corresponding connecting port 141 is selected for installation according to different valve cores 220. When the valve stem sleeve 140 is damaged, another valve stem sleeve 140 is easily replaced separately.

Figure 4:
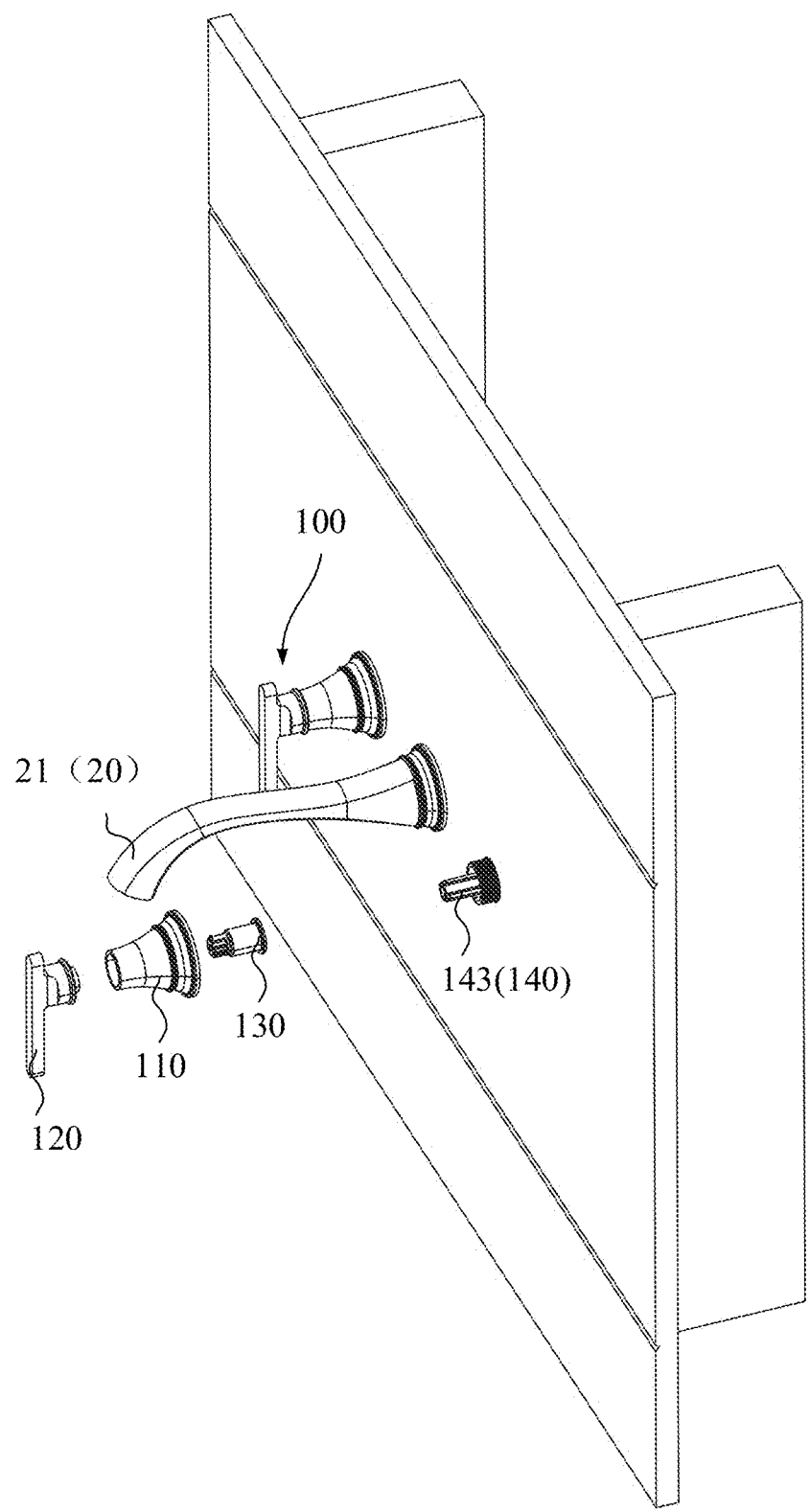
FIG. 4 is an exploded schematic diagram of the faucet installed on the wall according to the first embodiment of the present disclosure.
Figure 5:
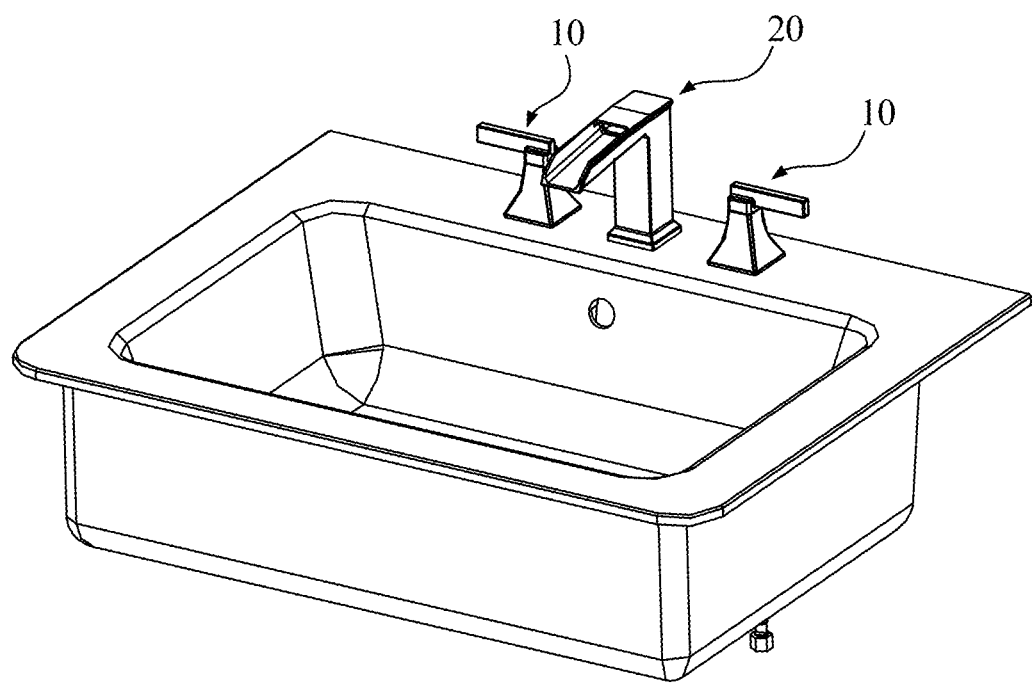
FIG. 5 is a schematic diagram of the faucet installed on a countertop according to a second embodiment of the present disclosure.
Figure 6:
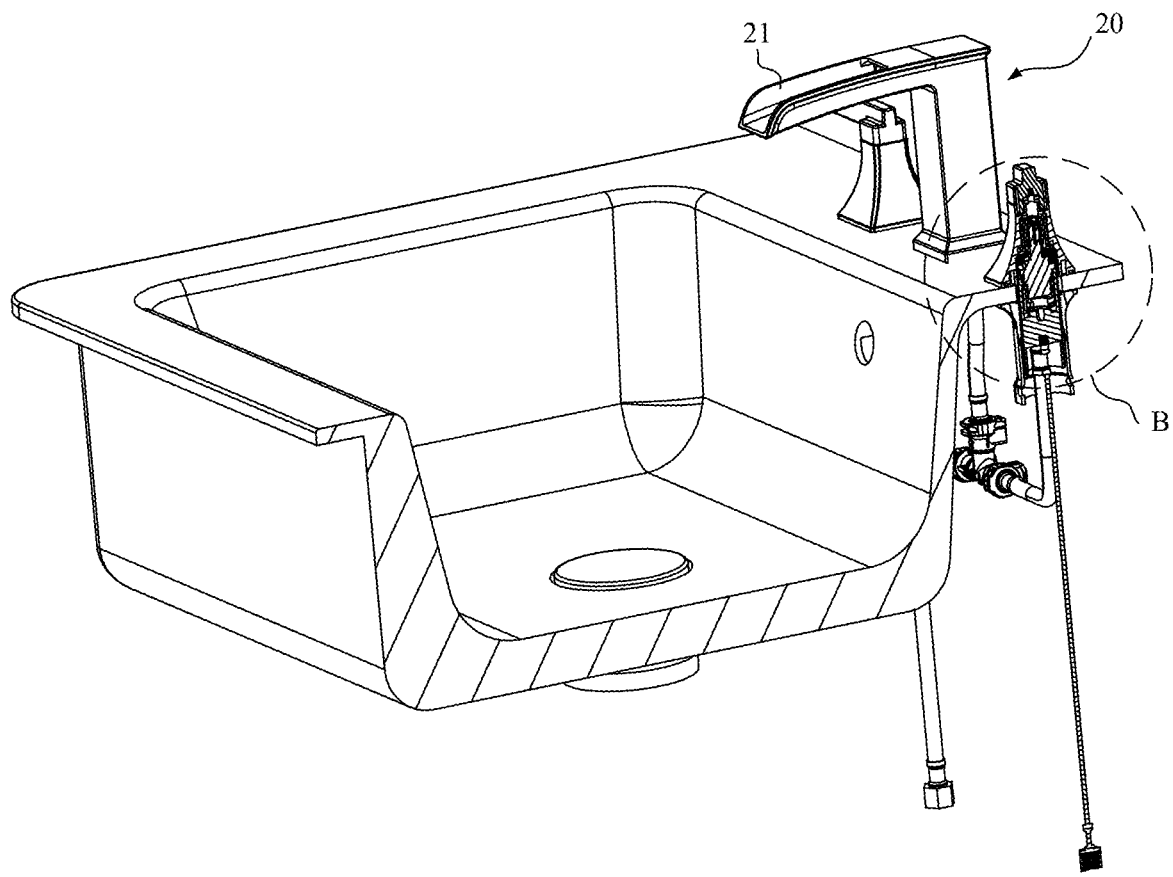
FIG. 6 is a cross-sectional schematic diagram of the faucet installed on the countertop according to the second embodiment of the present disclosure.
Figure 7:
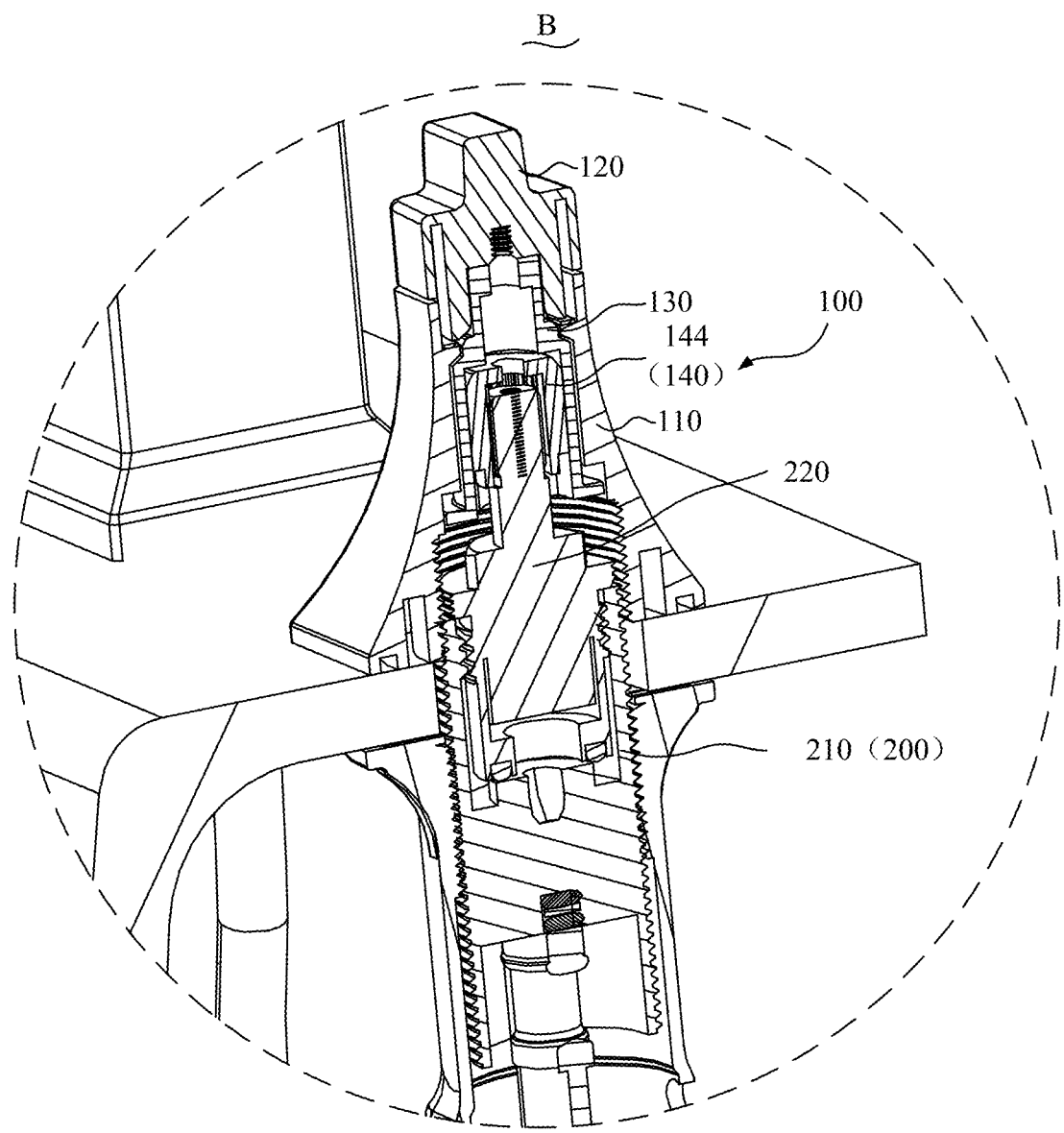
FIG. 7 is an enlarged schematic diagram of area B shown in FIG. 6.
Figure 8:
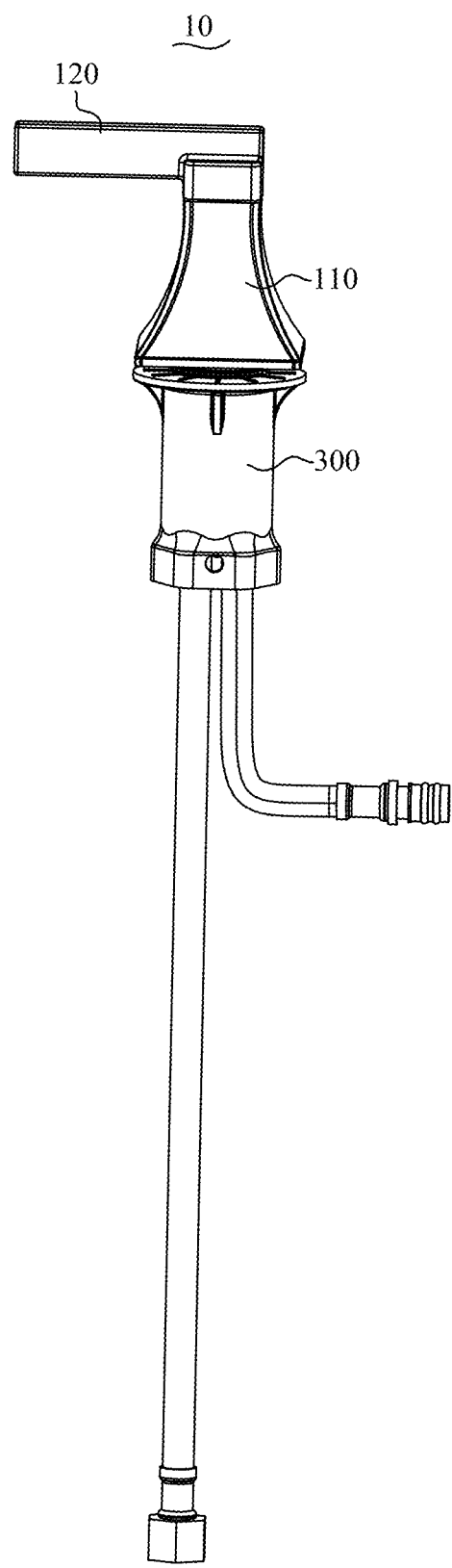
FIG. 8 is a schematic diagram of a faucet controller according to one embodiment of the present disclosure.

The valve stem sleeve 140 is selected from a first valve stem sleeve 143 and a second valve stem sleeve 144. A length of the first valve stem sleeve 143 is different from a length of the second valve stem sleeve 144. One of the first valve stem sleeve 143 and the second valve stem sleeve 144 is detachably connected to the bushing 130. Specifically, as shown in FIGS. 4 and 7, the length of the first valve stem sleeve 143 is greater than the length of the second valve stem sleeve 144. The first valve stem sleeve 143 is configured to be connected to the bushing 130 of the handle assembly 100 installed on the wall, and the second valve stem sleeve 144 is configured to be connected to the handle assembly 100 installed on the countertop.

In addition, since the valve assembly 200 is generally pre-installed on the wall during installation, a size of the valve assembly 200 exposed on the wall is difficult to control, and a deviation range is large. For example, when a merchant recommends that an exposed range of the valve assembly 200 is 10-20 mm, the size of the valve assembly 200 exposed on the wall after installation may be 7 mm. 8 mm, 9 mm, 21 mm, 22 mm, or 23 mm, etc. Therefore, when an extension length of the valve core 220 is short, the valve stem sleeve 140 that is relatively long is selected to compensate for an installation gap. When the extension length of the valve core 220 is long, the valve stem sleeve 140 that is relatively short is selected to ensure that a bottom surface of the base 110 contacts the wall after installation. In this way, the handle assembly 100 is able to adapt to different installation environments and installation deviation does not affect installation stability.

In some embodiments, a length of the valve stem sleeve 140 may be 2-15 cm, such as 2.0 cm, 2.2 cm, 2.5 cm, 2.8 cm, 3 cm, 3.2 cm, 3.5 cm, 4 cm, 4.5 cm, 5.0 cm, 5.5 cm, 6.0 cm, 7.0 cm, 7.5 cm, 8 cm, 8.5 cm, 9 cm, 9.5 cm, 10 cm, 11 cm, 12 cm, 13 cm, 14 cm, 15 cm, etc, which is not limited thereto. Moreover, a plurality of valve stem sleeves 140 may be provided according to actual needs, so the user is able to select the suitable valve stem sleeve 140 from the plurality of valve stem sleeves 140. For example, the number of the plurality of valve stem sleeves 140 is two, three, four, five, etc., which is not limited thereto.

In some embodiments, the handle 120 comprises at least one first positioning portion 121. At least one second positioning portion 131 is disposed on the first end of the bushing 130. At least one first limiting portion 132 is disposed on the second end of the bushing 130. At least one second limiting portion 142 is disposed on the valve stem sleeve 140. The at least one first positioning portion 121 is matched with the at least one second positioning portion 131, so that the bushing 130 and the handle are only allowed to be installed in a single circumferential direction. The at least one first limiting portion 132 is matched with the at least one second limiting portion 142, so that the bushing 130 and the valve stem sleeve 140 are only allowed to be installed in the single circumferential direction. The at least one first positioning portion 121 is matched with the at least one second positioning portion 131, ensuring that the bushing 130 and the handle 120 are only allowed to be installed in the single circumferential direction, thereby improving accuracy and efficiency of the installation. Similarly, the at least one first limiting portion 132 is matched with the at least one second limiting portion 142, enabling that the bushing 130 and the valve stem sleeve 140 are only allowed to be installed in the single circumferential direction, thereby ensuring correct cooperation between the components of the handle assembly and reducing problems that may be caused by improper installation. In addition, the installation restriction of installing along the single circumferential direction helps to ensure a tight connection and a stable cooperation between the bushing 130, the handle 120, and the valve stem sleeve 140, and prevents problems such as water leakage and poor operation caused by loose or displaced components.

Figure 12:
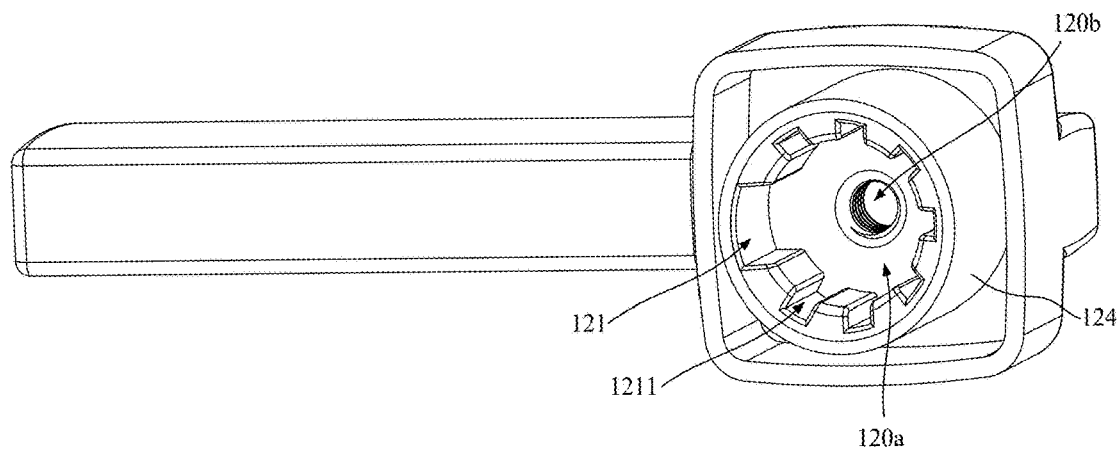
FIG. 12 is a schematic diagram of a handle according to one embodiment of the present disclosure.

As shown in FIG. 12, in some embodiments, a mounting groove 120a is defined on a bottom portion of the handle 120. The at least one first positioning portion 121 is at least one positioning groove 1211 recessed from a side wall of the mounting groove 120a. The at least one second positioning portion 131 is at least one positioning boss 1311 protruding from an outer wall of the bushing 130. The first end of the bushing 130 is plugged into the mounting groove 120a, and the at least one positioning boss 1311 is engaged with the at least one positioning groove 1211, so that the bushing 130 and the handle 120 are only allowed to be installed in the single circumferential direction. In the embodiment, the installation of the bushing 130 and the handle 120 is simple, and the connection between the at least one positioning boss 1311 and the at least one positioning groove 1211 ensures that the bushing 130 and the handle are only allowed to be installed in a specific direction. During an assembly process, the operator does not need to spend a lot of time trying different installation directions, but only needs to operate according to a connection relationship between the at least one positioning boss 1311 and the at least one positioning groove 1211, thereby improving assembly efficiency.

Alternatively, the bushing 130 may define the mounting groove 120*a* and the at least one positioning groove 1211, while the handle 120 comprises a fixing rod extending into the mounting groove 120*a* defined on the bushing 130, and at least one positioning protrusion matched with the at least one positioning groove 121 is disposed on an outer wall surface of the fixing rod. The present disclosure does not limit specific forms of the at least one first positioning portion 121 and the at least one second positioning portion 131.

In some embodiments, the at least one positioning groove 1211 comprises one positioning groove 1211, and the at least one positioning boss 1311 comprises one positioning boss 1311. In the embodiment, only one positioning groove 1211 and one positioning boss 1311 are provided, so that the handle 120 and the bushing 130 are installed in the single circumferential direction, an overall structure of the handle assembly is concise, and the number and complexity of components thereof are reduced. The configurations not only reduce production costs, but also simplify the installation and disassembly process and improve production efficiency.

Figure 13:
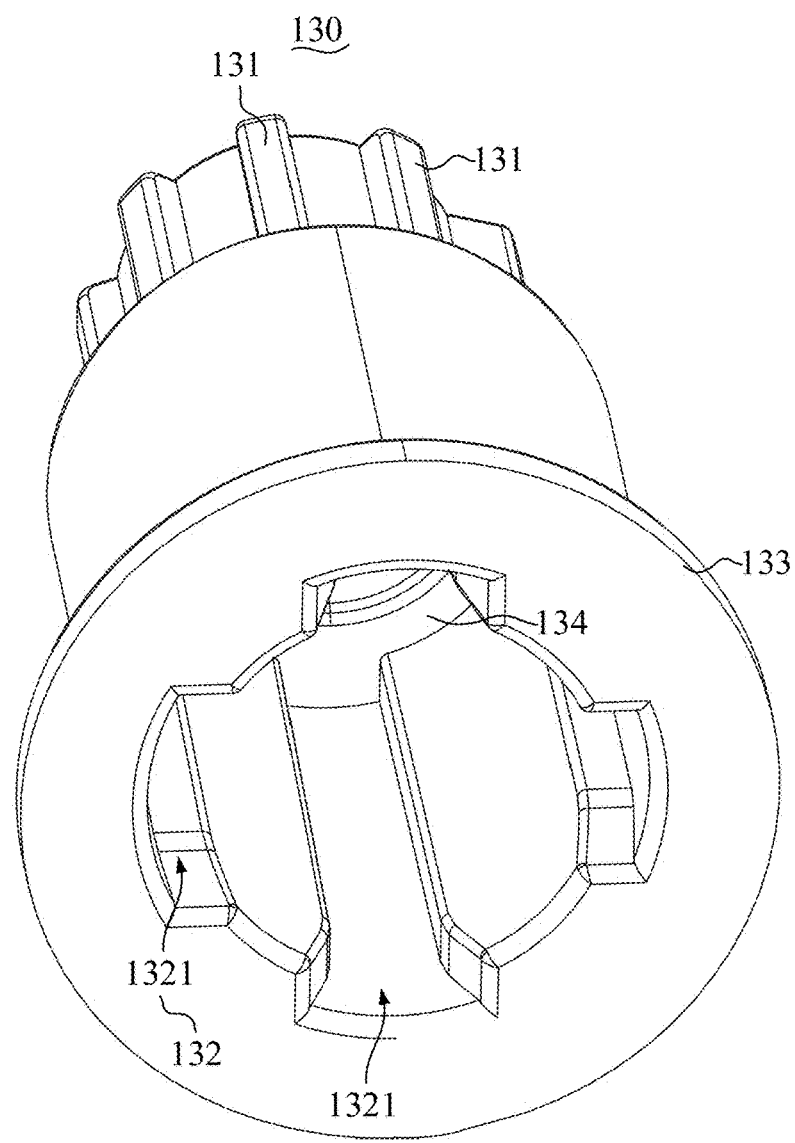
FIG. 13 is a schematic diagram of a bushing according to one embodiment of the present disclosure.
Figure 14:
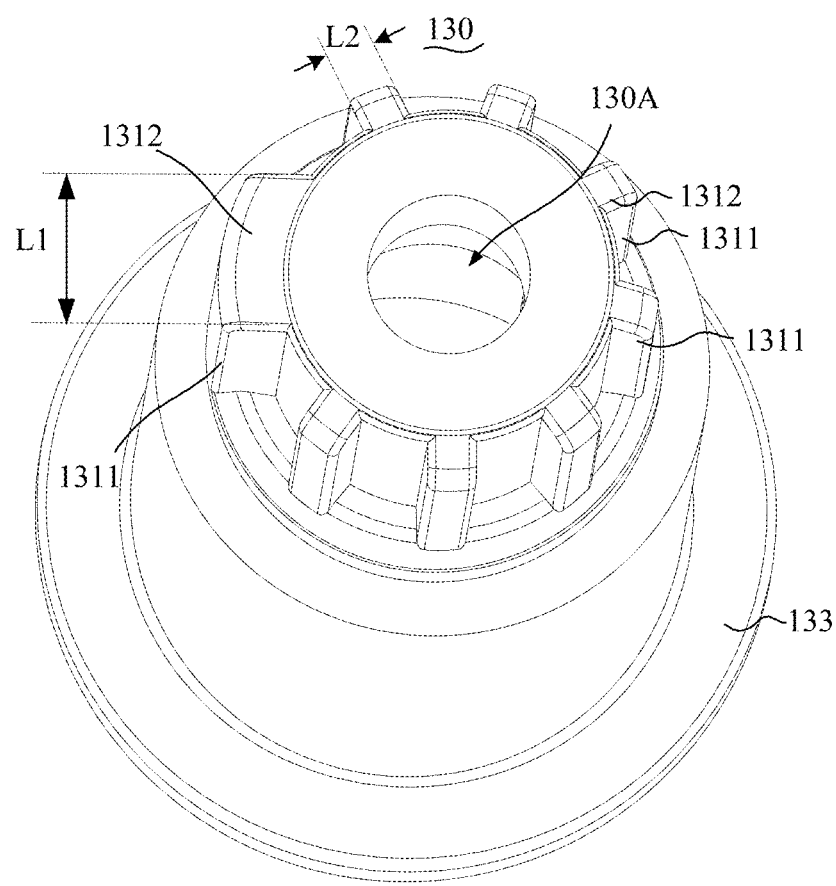
FIG. 14 is another schematic diagram of the bushing according to one embodiment of the present disclosure.
Figure 15:
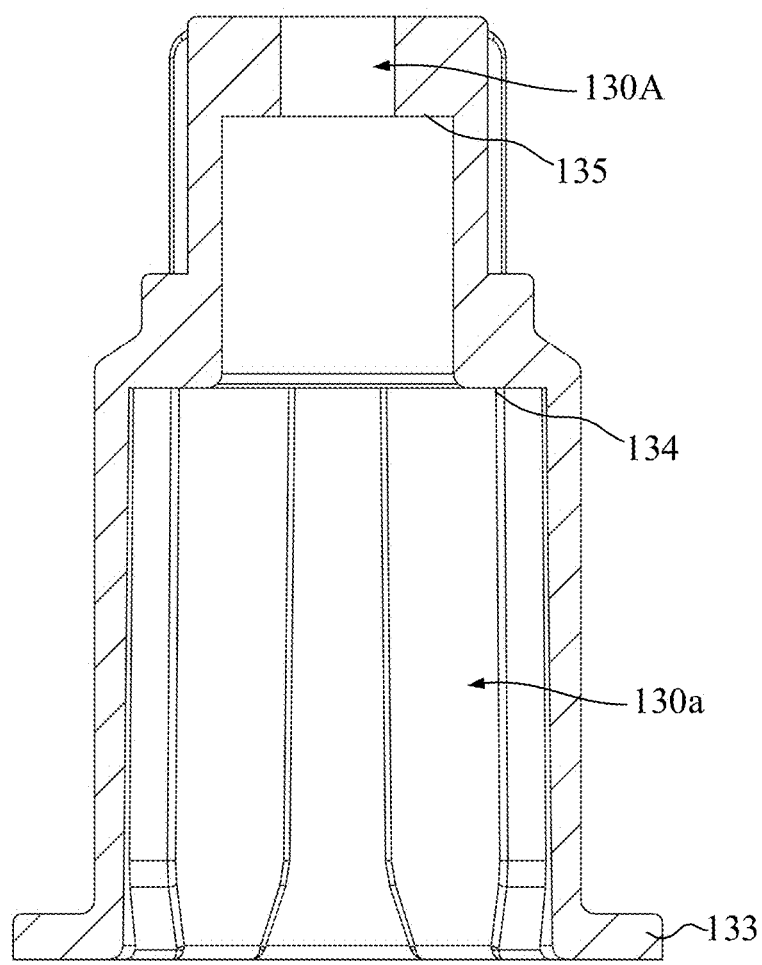
FIG. 15 is a cross-sectional schematic diagram of the bushing according to one embodiment of the present disclosure.

Alternatively, as shown in FIGS. 13-15, in some embodiments, the at least one positioning groove 1211 comprises a plurality of positioning grooves 1211, the at least one positioning boss 1311 comprises a plurality of positioning bosses 1311. The plurality of positioning bosses 1311 are distributed at unequal angles in a circumferential direction of the mounting groove 120*a*. Positions and outer contours of the plurality of positioning grooves 1211 are respectively matched with positions and outer contours of the plurality of positioning bosses 1311. In the embodiment, the number of the plurality of positioning grooves 1211 and the number of the plurality of positioning bosses 1311 may be two, three, four, five, etc. When there are two positioning bosses 1311, the two positioning bosses 1311 are asymmetrically disposed in the circumferential direction. In this way, the bushing 130 and the handle 120 are only allowed to be installed in the single circumferential direction, which effectively prevents the operator from installing the handle in a wrong direction during the installation process and improves the accuracy and reliability of the installation. In addition, compared with a solution where only one positioning boss 1311 and one positioning groove 1211 are provided, the connection of the plurality of positioning bosses 1311 and the plurality of positioning grooves 1211 increases a connection area and contact points between the bushing 130 and the handle 120, thereby improving the connection stability between the bushing 130 and the handle 120 and preventing relative rotation or loosening between the bushing 130 and the handle 120.

As shown in FIGS. 13-15, in some embodiments, the at least one positioning groove 1211 comprises the plurality of positioning grooves 1211, and the at least one positioning boss 1311 comprises the plurality of positioning bosses 1311. A width L1 of one of the plurality of positioning bosses 1311 is greater than a width L2 of another positioning boss, and sizes of the plurality of positioning grooves 1211 are respectively matched with sizes of the plurality of positioning bosses 1311. In the embodiment, the number of the plurality of positioning grooves 1211 and the number of the plurality of positioning bosses 1311 may be two, three, four, five, etc. Since the width L1 of the one of the plurality of the positioning bosses 1311 is greater than the width L2 of the other positioning bosses 1311, during the installation process, the operator is able to easily identify a larger positioning boss (i.e., the one of the plurality of the positioning bosses 1311) and match it with a corresponding one of the plurality of positioning grooves 1211, thereby completing the installation quickly and accurately. In the embodiment, an installation direction between the handle 120 and the bushing 130 is limited by configuring the size of the one of the plurality of positioning bosses 1311 being greater than the size of the other positioning bosses 1311. The plurality of positioning bosses 1311 are disposed at equal spacing or at different spacings.

In some embodiments, a first guide surface 1312 is disposed at one end, close to the handle, of the at least one positioning boss 1311. The first guide surface 1312 is obliquely disposed in a direction away from the handle 120. When installing the bushing 130 and the handle 120, each first guide surface 1312 obliquely disposed makes it easier for each of the positioning bosses 1311 to slide into a corresponding one of the positioning grooves 1211. Even if there is a certain deviation in the hand operation of the operator, each of the positioning bosses 1311 is allowed to smoothly enter the corresponding one of the positioning grooves 1211 along the first guide surface 1312 thereof without precise alignment, which reduces the difficulty of installation and improves the installation efficiency.

In some embodiments, a fixing groove 130*a* is defined on the second end of the bushing 130. The at least one first limiting portion 132 is at least one limiting groove 1321 recessed from a side wall of the fixing groove 130*a*. The at least one second limiting portion 142 is at least one limiting boss 1421 protruding from an outer wall of the valve stem sleeve 140. The first end of the valve stem sleeve 140 is plugged into the at least one limiting groove 1321. The at least one limiting boss 1421 is engaged with the at least one limiting groove 1321, so that the bushing 130 and the valve stem sleeve 140 are only allowed to be installed in the single circumferential direction. In the embodiment, the installation of the bushing 130 and the valve stem sleeve 140 is simple.

Alternatively, structures of at least one first limiting portion 132 and the at least one second limiting portion 142 can be replaced.

In some embodiments, the at least one limiting groove 1321 comprises one limiting groove 1321, and the at least one limiting boss 1421 comprises one limiting boss 1421. In the embodiment, only one limiting groove 1321 and one limiting boss 1421 are provided, which enables that the handle 120 and the bushing 130 are only allowed to be installed in the single circumferential direction, while making the overall structure of the handle assembly concise, reducing the number and complexity of the components thereof. The arrangements not only reduce production costs, but also simplify the installation and disassembly process and improve the production efficiency.

Alternatively, the at least one limiting groove 1321 comprises a plurality of limiting grooves 1321, and the at least one limiting boss 1421 comprises a plurality of limiting bosses 1421. The plurality of limiting bosses 1421 are distributed at unequal angles in a circumferential direction of the fixing groove 130*a*, and positions of the plurality of limiting grooves 1321 are respectively matched with positions of the plurality of limiting bosses 1421. In the embodiment, the number of the plurality of limiting grooves 1321 and the number of the plurality of limiting bosses 1421 may be two, three, four, five, etc. When there are two limiting bosses 1421, the two limiting bosses 1421 are asymmetrically disposed in the circumferential direction. In this way, the bushing 130 and the valve stem sleeve 140 are only allowed to be installed in the single circumferential direction, which effectively prevents the operator from installing the valve stem sleeve 140 in a wrong direction during the installation process and improves the accuracy and reliability of the installation. In addition, compared with a solution where only one limiting boss 1321 and one limiting groove 1421 are provided, the connection of the plurality of limiting bosses 1421 and the plurality of limiting grooves 1321 increases a connection area and contact points between the bushing 130 and the valve stem sleeve 140, thereby improving the connection stability between the bushing 130 and the valve stem sleeve 140 and preventing relative rotation or loosening between the bushing 130 and the valve stem sleeve 140.

Figure 16:
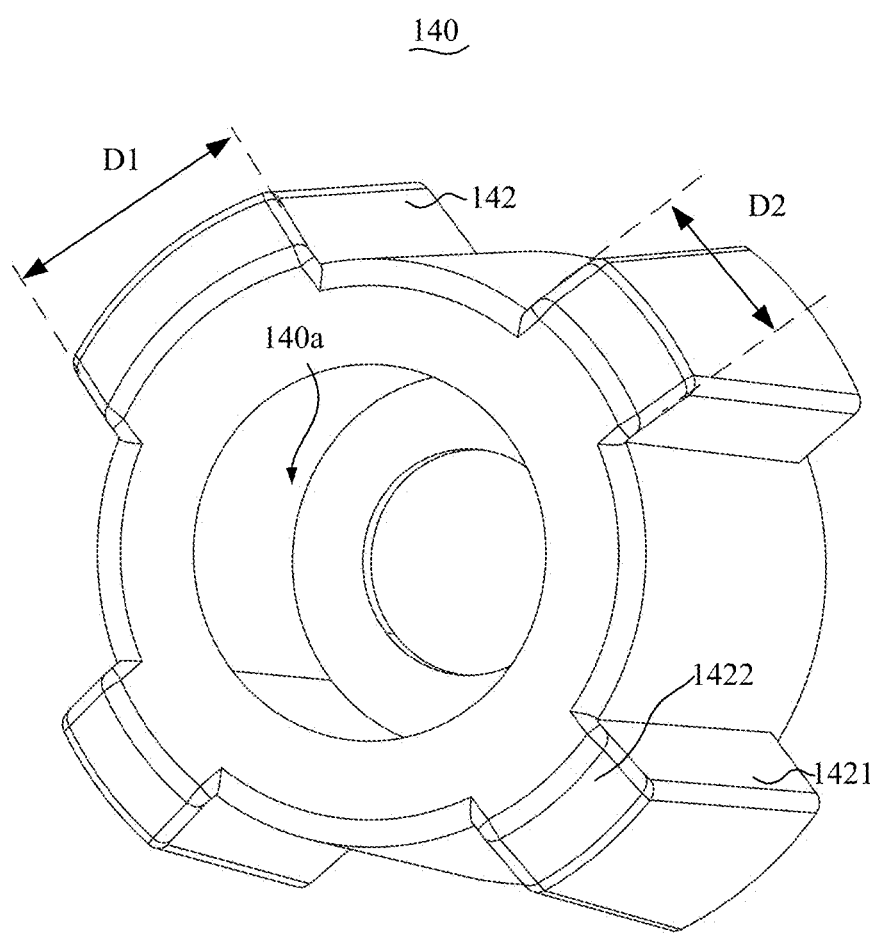
FIG. 16 is a schematic diagram of a valve stem sleeve according to one embodiment of the present disclosure.

As shown in FIG. 16, in some embodiments, the at least one limiting groove 1321 comprises the plurality of limiting grooves 1321, the at least one limiting boss 1421 comprises the plurality of limiting bosses 1421, a width D1 of one of the plurality of limiting bosses 1421 is greater than a width D2 of another limiting boss, and sizes of the plurality of limiting grooves 1321 are respectively matched with sizes of the plurality of limiting bosses 1421.

In the embodiment, the number of the plurality of limiting grooves 1321 and the number of the plurality of limiting bosses 1421 may be two, three, four, five, etc. Since the width D1 of the one of the plurality of the limiting bosses 1421 is greater than the width D2 of the other limiting bosses 1421, during the installation process, the operator is able to easily identify a larger limiting boss (i.e., the one of the plurality of the limiting bosses 1421) and match it with a corresponding one of the plurality of limiting grooves 1211, thereby completing the installation quickly and accurately. In the embodiment, an installation direction between the valve stem sleeve 140 and the bushing 130 is limited by configuring the size of the one of the plurality of limiting bosses 1421 being greater than the size of the other limiting bosses 1421. The plurality of limiting bosses 1421 are disposed at equal spacing or at different spacings. In some embodiments, a second guide surface 1422 is disposed at one end, close to the bushing 130, of the at least one limiting boss 1421. The second guide surface 1422 is obliquely disposed upwards in a direction away from the bushing 130. When installing the bushing 130 and the valve stem sleeve 140, each second guide surface 1422 obliquely disposed makes it easier for each of the limiting bosses 1421 to slide into a corresponding one of the limiting grooves 1321. Even if there is a certain deviation in the hand operation of the operator, each of the limiting bosses 1421 is allowed to smoothly enter the corresponding one of the limiting grooves 1321 along the second guide surface 1422 thereof without precise alignment, which reduces the difficulty of installation and improves the installation efficiency.

In some embodiments, as shown in FIG. 12, the handle 120 comprises a rotating shaft portion 124. The rotating shaft portion 124 is of a column structure and defines the mounting groove 120a facing downward. The mounting cavity 110a comprises a hole section 113. The rotating shaft portion 124 is rotatably installed in the hole section 113. In this way, relative rotation stability of the handle 120 and the base 110 is improved. A portion of a bottom wall of the hole section 113 protrudes inward to form a positioning step 114.

Furthermore, the handle assembly 100 further comprises a spacer 150. The spacer 150 is made of metal material, such as iron, copper, aluminum, etc. The spacer 150 is installed on the positioning step 114 and is disposed between the positioning step 114 and an end face of the rotating shaft portion 124. The spacer 150 is configured to reduce wear between the rotating shaft portion 124 and the hole section 113. In this way, the handle 120 and the base 110 are prevented from being worn during rotation, thereby increasing service life of the handle assembly 100.

The first end of the bushing 130 is inserted into the mounting groove 120a and abuts against a bottom wall of the mounting groove 120a. The handle 120 defines a blind hole 120b. The blind hole 120b is formed by recessing from the bottom wall of the mounting groove 120a. The bushing 130 defines a through hole 130A, and the fixing groove 130a forms a part of the through hole 130A. The handle assembly 100 further comprises a connecting piece (not shown in the drawings). The connecting piece passes through the through hole 130A and is fixed in the blind hole 120b, so that the bushing 130 is fixed to the handle 120. In this way, the handle 120 and the bushing 130 are prevented from being separated from each other in an axial direction.

In some embodiments, a first limiting step 134 is formed on a bottom wall of the fixing groove 130a in the axial direction of the bushing 130. The first limiting step 134 is configured to limit a length of the valve stem sleeve 140 extending into the fixing groove 130a. In this way, interference between the valve stem sleeve 140, the connecting piece, and the bushing 130 is prevented.

In some embodiments, the connecting piece is a screw, and the blind hole 120b is a threaded hole. A second limiting step 135 is disposed on an inner wall of the through hole 130A. A head of the screw abuts against the second limiting step 135. The fixing groove 130a configured to mount the valve stem sleeve 140 is disposed between the second end of the bushing 130 and the second limiting step 135. The arrangements not only improve the installation stability between the handle 120 and the bushing 130, but also avoid interference between the screw and the valve stem sleeve 140.

In other embodiments, the connecting piece may be a buckle, the blind hole 120b may be a buckle hole, and the buckle is buckled with the handle 120 and the bushing 130 to realize relative fixation of the handle 120 and the bushing 130 in the axial direction.

Figure 11:
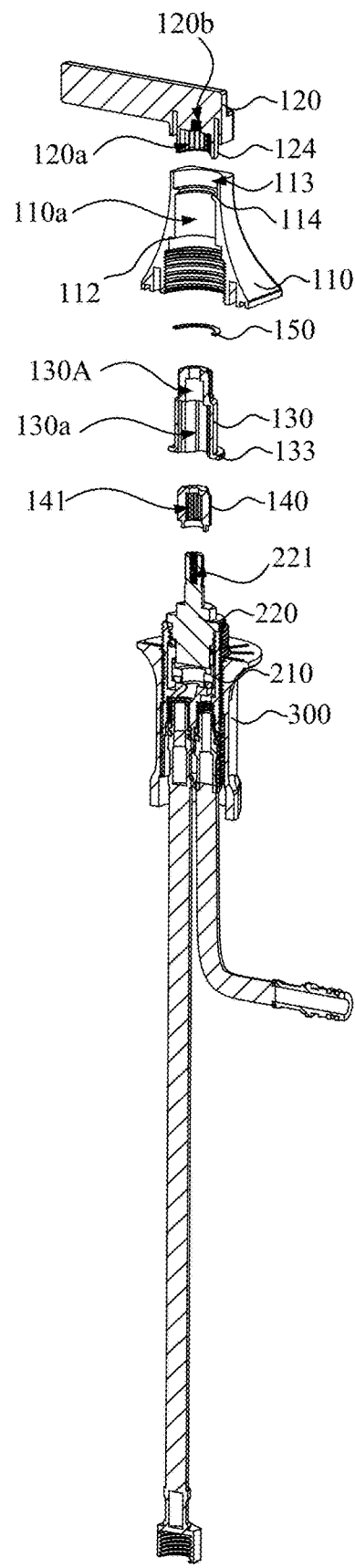
FIG. 11 is an exploded cross-sectional schematic diagram of the faucet controller according to one embodiment of the present disclosure.

As shown in FIGS. 11 and 14, in some embodiments, the bushing 130 comprises a limiting protrusion 133. The mounting cavity 110a comprises a mounting step 112, and the limiting protrusion 133 abuts against the mounting step 112. In this way, the relative stability of the base 110 and the bushing 130 in the axial direction is improved. In addition, when the base 110 is threadedly connected to the valve body 210, the bushing 130 is driven to move in the axial direction, thereby improving the stability of the installation of the bushing 130 and the valve stem sleeve 140.

In some embodiments, as shown in FIGS. 11 and 14, the valve core 220 defines a threaded fixing hole 221. The valve stem sleeve 140 defines a mounting hole 140a. The screw passes through the mounting hole 140a and is fixed in the threaded fixing hole 221, so that the valve stem sleeve 140 is connected to the valve core 220. In this way, axial stability of the valve core 220 and the valve stem sleeve 140 is improved, and the valve core 220 and the valve stem sleeve 140 are prevented from being separated from each other.

Figure 9:
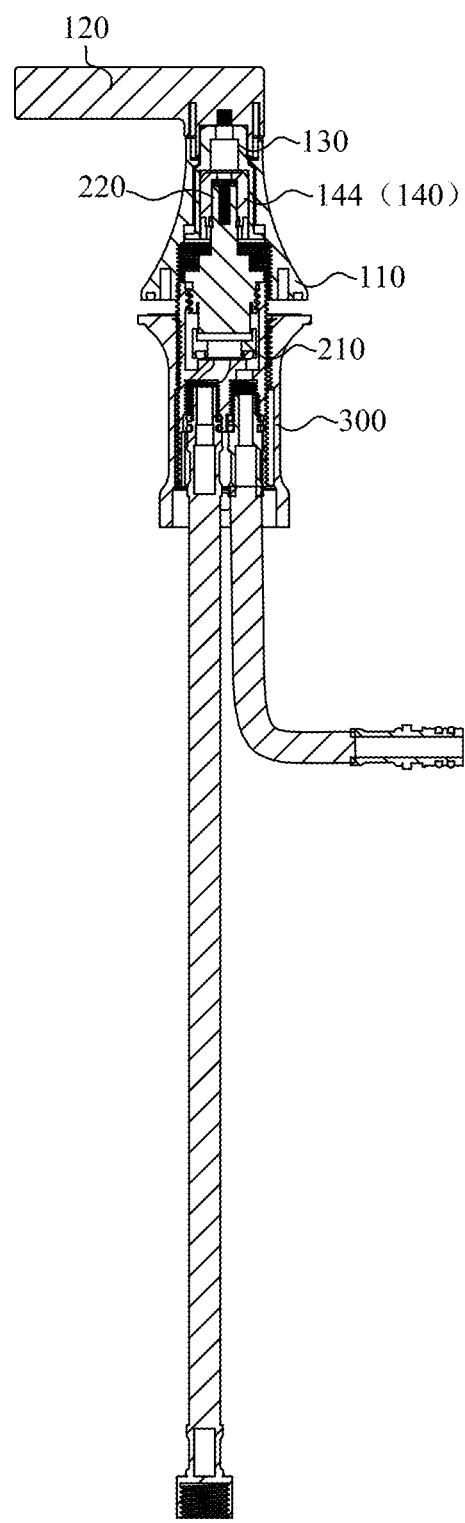
FIG. 9 is a cross-sectional schematic diagram of the faucet controller according to one embodiment of the present disclosure.
Figure 10:
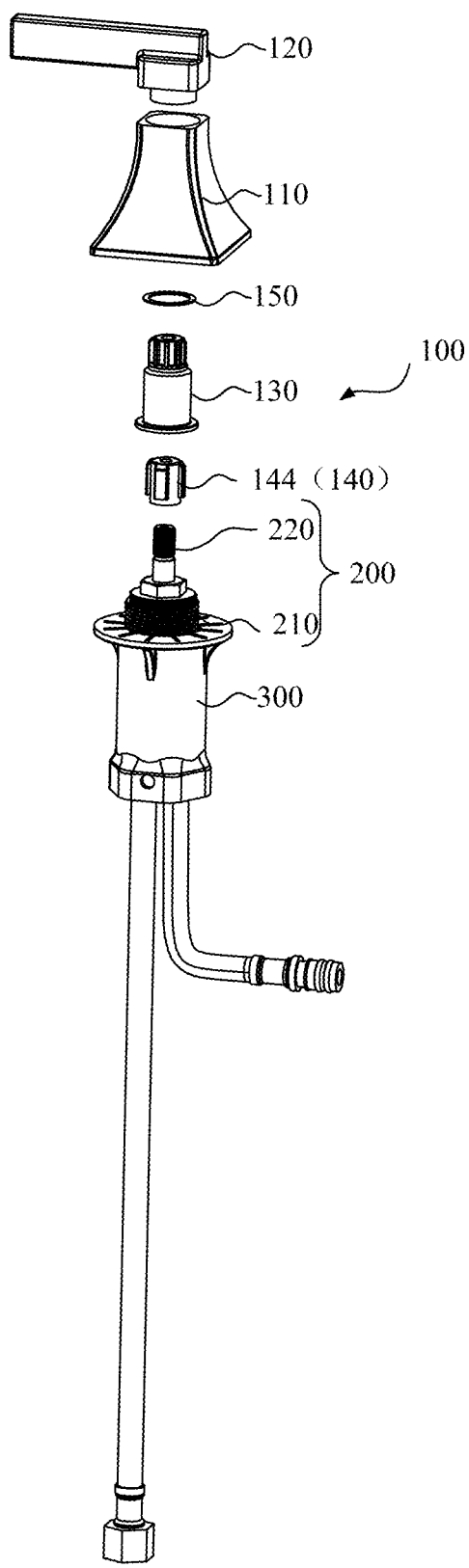
FIG. 10 is an exploded schematic diagram of the faucet controller according to one embodiment of the present disclosure.

In some embodiments, as shown in FIGS. 9-11, the faucet controller 10 further comprises a sleeve 300. The sleeve 300 is sleeved on an outer side of the valve body 210 and is screwed with the valve body 210. After the sleeve 300 is installed in place, the base 110 of the handle assembly 100 abuts against one side of the sleeve 300. The faucet controller 10 in the embodiment is applied to the scenario where the faucet 1 is installed on the countertop. When an assembly hole on the countertop is relatively large, the sleeve 300 is sleeved on the outer side of the valve body 210, and the base 110 is determined to be installed in place when the base abuts against the sleeve 300.

In summary, the installation process of the faucet 1 of the present disclosure is described by taking the solution of installing the faucet on the wall as an example (the installations of the two faucet controllers are similar and the following only takes one faucet controller as an example for further illustration).

First, the valve assembly 200 and the water outlet pipe are installed on the wall, and most portions of the valve assembly 200 and the water outlet pipe are pre-installed inside the wall. Only the valve core 220 of the valve assembly is exposed, and a connecting pipe of the water outlet pipe is exposed. Then, the water outlet nozzle 21 is installed on the water outlet pipe. According to an exposed size of the valve core 220, the suitable valve stem sleeve 140 to be installed on the valve core 220 is selected. Specifically, the second end of the valve stem sleeve 140 with the connecting port 141 is sleeved on the valve core 220. Then, the screw is inserted into the mounting hole 140a of the valve stem sleeve 140 and fixed to the threaded fixing hole 221 of the valve core 220. At this time, the valve stem sleeve 140 and the valve core 220 are fixed in both the circumferential direction and the axial direction. It should be noted that when the valve stem sleeve 140 is sleeved on the valve core 220, the plurality of the limiting bosses 1421 of the valve stem sleeve 140 are installed at a redetermined angle. That is, the valve stem sleeve 140 is installed according to a rotation direction of the valve core 220 and an orientation of the handle 120. For example, the plurality of limiting bosses 1421 with a positioning effect are disposed upward, downward, leftward or rightward.

Next, the spacer 150 and the rotating shaft portion 124 of the handle 120 are inserted into the hole section 113 from a head of the base 110, and the bushing 130 is inserted into the mounting cavity 110a from the bottom of the base 110. The bushing 130 is inserted into the mounting groove 120a, and the faucet controller 10 is fixed in the circumferential direction through the plurality of positioning bosses 1311 and the plurality of positioning grooves 1211. Then, the screw passes through the through hole 130A of the bushing 130 and is fixed in the blind hole 120b of the handle 120 to fix the faucet controller in the axial direction. At this time, under an action of the handle 120, the plurality of limiting protrusions 133 of the bushing 130 and the screw, the handle 120, the bushing 130 and the base 110 are relatively fixed in the axial direction. Then, the plurality of limiting grooves 1321 of the bushing 130 are matched and installed with the plurality of limiting bosses 1421. At this time, an orientation angle of the handle 120 extends according to a predetermined orientation angle. Then, the base 110 and the valve body 210 are screwed and tightened, and the bushing 130 and the valve stem sleeve 140 are driven to move relative to each other, so that the valve stem sleeve 140 is inserted into the fixing groove 130a. When a bottom end of the base 110 abuts against the wall, the installation of the faucet is completed.

The present disclosure improves the fit between the base 110 and the wall after installation by providing different valve stem sleeves 140 of different lengths. The handle 120 and the bushing 130 are installed in the single circumferential direction, and the bushing 130 and the valve stem sleeve 140 are installed in the single circumferential orientation. The handle 120 is extended at the predetermined angle, avoiding interference with other components (such as the water outlet nozzle 21) during the rotation of the handle 120 after installation.

In the drawings of the embodiments, the same or similar numbers correspond to the same or similar components; in the description of the present disclosure, it should be understood that terms such as "upper", "lower", "left", "right" etc. indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A handle assembly, comprising:
    a handle;
    a bushing; and
    a valve stem sleeve;
    wherein a first end of the bushing is fixed to the handle, a first end of the valve stem sleeve is detachably connected to a second end of the bushing away from the handle, a connecting port matched with a valve core is disposed on a second end of the valve stem sleeve away from the bushing;
    wherein the handle comprises at least one first positioning portion, at least one second positioning portion is disposed on the first end of the bushing, at least one first limiting portion is disposed on the second end of the bushing, and at least one second limiting portion is disposed on the valve stem sleeve;
    wherein the at least one first positioning portion is matched with the at least one second positioning portion, so that the bushing and the handle are only allowed to be installed in a single circumferential direction, and the at least one first limiting portion is matched with the at least one second limiting portion, so that the bushing and the valve stem sleeve are only allowed to be installed in the single circumferential direction.

2. The handle assembly according to claim 1, wherein a mounting groove is defined on a bottom portion of the handle, the at least one first positioning portion is at least one positioning groove recessed from a side wall of the mounting groove, the at least one second positioning portion is at least one positioning boss protruding from an outer wall of the bushing, the first end of the bushing is plugged into the mounting groove, and the at least one positioning boss is engaged with the at least one positioning groove, so that the bushing and the handle are only allowed to be installed in the single circumferential direction.

3. The handle assembly according to claim 2, wherein the at least one positioning groove comprises one positioning groove, and the at least one positioning boss comprises one positioning boss; or the at least one positioning groove comprises a plurality of positioning grooves, the at least one positioning boss comprises a plurality of positioning bosses, the plurality of positioning bosses are distributed at unequal angles in a circumferential direction of the mounting groove, and positions of the plurality of positioning grooves are respectively matched with positions of the plurality of positioning bosses; or the at least one positioning groove comprises the plurality of positioning grooves, the at least one positioning boss comprises the plurality of positioning bosses, a width L1 of one of the plurality of positioning bosses is greater than a width L2 of another positioning boss, and sizes of the plurality of positioning grooves are respectively matched with sizes of the plurality of positioning bosses.

4. The handle assembly according to claim 2, wherein a first guide surface is disposed at one end, close to the handle, of the at least one positioning boss, and the first guide surface is obliquely disposed in a direction away from the handle.

5. The handle assembly according to claim 1, wherein a fixing groove is defined on the second end of the bushing, the at least one first limiting portion is at least one limiting groove recessed from a side wall of the fixing groove, the at least one second limiting portion is at least one limiting boss protruding from an outer wall of the valve stem sleeve, the first end of the valve stem sleeve is plugged into the at least one limiting groove, and the at least one limiting boss is engaged with the at least one limiting groove, so that the bushing and the valve stem sleeve are only allowed to be installed in the single circumferential direction.

6. The handle assembly according to claim 5, wherein the at least one limiting groove comprises one limiting groove, and the at least one limiting boss comprises one limiting boss; or the at least one limiting groove comprises a plurality of limiting grooves, the at least one limiting boss comprises a plurality of limiting bosses, the plurality of limiting bosses are distributed at unequal angles in a circumferential direction of the fixing groove, and positions of the plurality of limiting grooves are respectively matched with positions of the plurality of limiting bosses; or the at least one limiting groove comprises the plurality of limiting grooves, the at least one limiting boss comprises the plurality of limiting bosses, a width D1 of one of the plurality of limiting bosses is greater than a width D2 of another limiting boss, and sizes of the plurality of limiting grooves are respectively matched with sizes of the plurality of limiting bosses.

7. The handle assembly according to claim 5, wherein a second guide surface is disposed at one end, close to the bushing, of the at least one limiting boss, and the second guide surface is obliquely disposed upwards in a direction away from the bushing.

8. The handle assembly according to claim 5, wherein the handle defines a blind hole, the bushing defines a through hole, and the fixing groove forms a part of the through hole;
wherein the handle assembly further comprises a connecting piece, the connecting piece passes through the through hole and is fixed in the blind hole, so that the bushing is fixed to the handle.

9. The handle assembly according to claim 8, wherein a first limiting step is formed on a bottom wall of the fixing groove in an axial direction of the bushing, and the first limiting step is configured to limit a length of the valve stem sleeve extending into the fixing groove.

10. The handle assembly according to claim 8, wherein a mounting groove is defined on the handle, the first end of the bushing is disposed in the mounting groove and abuts against a bottom portion of the mounting groove, and the blind hole is defined on the bottom portion of the mounting groove.

11. The handle assembly according to claim 10, wherein the connecting piece is a screw, and the blind hole is a threaded hole;
wherein a second limiting step is disposed on an inner wall of the through hole, a head of the screw abuts against the second limiting step, and the fixing groove configured to mount the valve stem sleeve is disposed between the second end of the bushing and the second limiting step.

12. A faucet controller, comprising:
a valve assembly, and
the handle assembly according to claim 1;
wherein the valve assembly comprises a valve body and the valve core rotatably installed on the valve body, and the valve stem sleeve is detachably connected to the valve core.

13. The faucet controller according to claim 12, wherein the valve core defines a threaded fixing hole, the valve stem sleeve defines a mounting hole, and a screw passes through the mounting hole and is fixed in the threaded fixing hole, so that the valve stem sleeve is connected to the valve core.

14. The faucet controller according to claim 12, wherein the faucet controller further comprises a sleeve, the sleeve is sleeved on an outer side of the valve body and is screwed with the valve body, and a base of the handle assembly abuts against one side of the sleeve.

15. A faucet, comprising:
a water outlet assembly; and
two faucet controllers according to claim 12;
wherein the two faucet controllers are respectively located on two sides of the water outlet assembly, and water outlets of the two faucet controllers are communicated with a water inlet of the water outlet assembly.

16. A handle assembly, comprising:
a handle;
a base defining a mounting cavity;
a bushing; and
a valve stem sleeve;
wherein a first end of the bushing is fixed to the handle, a first end of the valve stem sleeve is detachably connected to a second end of the bushing away from the handle, a connecting port matched with a valve core is disposed on a second end of the valve stem sleeve away from the bushing;
wherein the handle is rotatably installed at a top portion of the base, the bushing and the valve stem sleeve are disposed in the mounting cavity, the bushing comprises a limiting protrusion, the mounting cavity comprises a mounting step, and the limiting protrusion abuts against the mounting step;
wherein the handle comprises a rotating shaft portion, the mounting cavity comprises a hole section, the rotating shaft portion is rotatably installed in the hole section, and a portion of a bottom wall of the hole section protrudes inward to form a positioning step;
wherein the handle assembly further comprises a spacer, the spacer is installed between the positioning step and an end face of the rotating shaft portion, and the spacer is configured to reduce wear between the rotating shaft portion and the hole section.

17. The handle assembly according to claim 16, wherein an internal thread is disposed on a side wall of the mounting cavity.

\* \* \* \* \*